US006457043B1

United States Patent
Kwak et al.

(10) Patent No.: US 6,457,043 B1
(45) Date of Patent: Sep. 24, 2002

(54) SPEAKER IDENTIFIER FOR MULTI-PARTY CONFERENCE

(75) Inventors: William I. Kwak, Acton; Steven E. Gardell, North Andover; Barbara Mayne Kelly, Concord, all of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/178,271

(22) Filed: Oct. 23, 1998

(51) Int. Cl.[7] ............................................... G06F 15/16
(52) U.S. Cl. ..................... 709/204; 709/205; 709/202
(58) Field of Search ................................. 709/204, 205, 709/228, 201, 206, 202; 370/352, 263

(56) References Cited

U.S. PATENT DOCUMENTS

| | | | | |
|---|---|---|---|---|
| 5,491,743 A | * | 2/1996 | Shiio et al. ................. | 709/204 |
| 5,572,728 A | * | 11/1996 | Tada et al. .................. | 707/200 |
| 5,619,555 A | * | 4/1997 | Fenton et al. ............. | 379/88.11 |
| 5,657,096 A | * | 8/1997 | Lukacs ....................... | 348/585 |
| 5,758,079 A | * | 5/1998 | Ludwig et al. ............. | 709/204 |
| 5,764,901 A | * | 6/1998 | Skarbo et al. .............. | 709/204 |
| 5,828,838 A | * | 10/1998 | Downs et al. .............. | 709/204 |
| 5,862,329 A | * | 1/1999 | Aras et al. .................. | 709/204 |
| 5,867,494 A | * | 2/1999 | Krishnaswamy et al. ... | 370/352 |
| 5,867,653 A | * | 2/1999 | Aras et al. .................. | 709/204 |
| 5,889,945 A | * | 3/1999 | Porter et al. ................ | 709/204 |
| 5,896,128 A | * | 4/1999 | Boyer ......................... | 345/327 |
| 5,907,324 A | * | 5/1999 | Larson et al. ............... | 709/204 |
| 5,991,277 A | * | 11/1999 | Maeng et al. ............... | 370/263 |
| 6,288,740 B1 | * | 9/2001 | Lai et al. .................... | 379/93.17 |

OTHER PUBLICATIONS

Heijenk et al, "Communication Systems Supporting Multimedia Multi–user Application", IEEE, 1994.*
Kobayashi Et. Al., "Virtual Conference Room : A Metaphor for Multi–User Real Time Conferencing Systems," IEEE International Workshop on Robot and Human Communication, 1993.*
Watabe Et. Al., "Distributed Desktop Conferencing System with Multiuser Multimedia Interface," IEEE Journal on Selected Areas in Communications, vol. 9, No. 4, May 1991.*
Labriola, "Here's looking at you ", Computer Shopper, Sep. 1997, pp. 335–362.*

* cited by examiner

Primary Examiner—Ayaz Sheikh
Assistant Examiner—Philip B. Tran
(74) Attorney, Agent, or Firm—Leonard Charles Suchyta; James K. Weixel

(57) ABSTRACT

A multi-party conferencing method and system determine which participants are currently speaking and send a speaker identification message to the terminals used by the participants in the conference. The terminals then display the speaker's identity on a display screen. When more than one participant is speaking at the same moment in time, the system analyzes the audio streams from the terminals and identifies a terminal associated with a dominant party. When multiple participants are using the terminal associated with the dominant party, the system identifies the speaking participant within the dominant party based on an indication received from the speaker. In one embodiment, the invention is implemented in an H.323 Internet telephony environment.

26 Claims, 6 Drawing Sheets

SPEAKER IDENTIFIER FOR MULTI-PARTY CONFERENCE

RELATED APPLICATIONS FILED CONCURRENTLY HEREWITH

This invention is related to the following inventions, all of which are filed concurrently herewith and assigned to the assignee of the rights in the present invention: Ser. No. 60/105,326 of Gardell et al. entitled "A HIGH SPEED COMMUNICATIONS SYSTEM OPERATING OVER A COMPUTER NETWORK"; Ser. No. 09/177,712 of Gardell et al. entitled "MULTI-LINE TELEPHONY VIA NETWORK GATEWAYS"; Ser. No. 09/178,130 of Gardell et al. entitled "NETWORK PRESENCE FOR A COMMUNICATIONS SYSTEM OPERATING OVER A COMPUTER NETWORK"; Ser. No. 09/178,178 of Gardell et al. entitled "SYSTEM PROVIDING INTEGRATED SERVICES OVER A COMPUTER NETWORK"; Ser. No. 09/177,415 of Gardell et al. entitled "REAL-TIME VOICEMAIL MONITORING AND CALL CONTROL"; Ser. No. 09/177,700 of Gardell et al. entitled "MULTI-LINE APPEARANCE TELEPHONY VIA A COMPUTER NETWORK"; and Ser. No. 09/177,712 of Gardell et al. entitled "MULTI-LINE TELEPHONY VIA NETWORK GATEWAYS".

FIELD OF THE INVENTION

The present invention relates to conferencing systems and, more specifically, to a system for identifying a speaker in a multi-party conference.

BACKGROUND OF THE INVENTION

Telephone conferencing systems provide multi-party conferences by sending the audio from the speaking participants in the conference to all of the participants in the conference. Traditional connection-based telephone systems set up a conference by establishing a connection to each participant. During the conference, the telephone system mixes the audio from each speaking participant in the conference and sends the mixed signal to all of the participants. Depending on the particular implementation, this mixing may involve selecting the audio from one participant who is speaking or it may involve combining the audio from all of the participants who may be speaking at the same moment in time. Many conventional telephone conferencing systems had relatively limited functionality and did not provide the participants with anything other than the mixed audio signal.

Telephone conferencing also may be provided using a packet-based telephony system. Packet-based systems transfer information between computers and other equipment using a data transmission format known as packetized data. The stream of data from a data source (e.g., a telephone) is divided into fixed length "chunks" of data (i.e., packets). These packets are routed through a packet network (e.g., the Internet) along with many other packets from other sources. Eventually, the packets from a given source are routed to the appropriate data destination where they are reassembled to provide a replica of the original stream of data.

Most packet-based telephony applications are for two-party conferences. Thus, the audio packet streams are simply routed between the two endpoints.

Some packet-based systems, such as those based on the H.323 protocol, may support conferences for more than two parties. H.323 is a protocol that defines how multimedia (audio, video and data) may be routed over a packet switched network (e.g., an IP network). The H.323 standard specifies which protocols may be used for the audio (e.g., G.711), video (e.g., H.261) and data (e.g., T.120). The standard also defines control (H.245) and signaling (H.225) protocols that may be used in an H.323 compliant system.

The H.323 standard defines several functional components as well. For example, an H.323-compliant terminal must contain an audio codec and support H.225 signaling. An H.323-compliant multipoint control unit, an H.323-compliant multipoint processor and an H.323-compliant multipoint controller provide functions related to multipoint conferences.

Through the use of these multipoint components, an H.323-based system may provide audio conferences. For example, the multipoint control unit provides the capability for two or more H.323 entities (e.g., terminals) to participate in a multipoint conference. The multipoint controller controls (e.g., provides capability negotiation) the terminals participating in a multipoint conference. The multipoint processor receives audio streams (e.g., G.711 streams) from the terminals participating in the conference and mixes these streams to produce a single audio signal that is broadcast to all of the terminals.

Traditionally, conferencing systems such as those discussed above do not identify the speaking party. Instead, the speaking party must identify himself or herself. Alternatively, the listening participants must determine who is speaking. Consequently, the participants may have difficulty identifying the speaking party. This is especially true when there are a large number of participants or when the participants are unfamiliar with one another. In view of the above, a need exists for a method of identifying speakers in a multi-party conference.

SUMMARY OF THE INVENTION

A multi-party conferencing method and system in accordance with our invention identify the participants who are speaking and send an identification of the speaking participants to the terminals of the participants in the conference. When more than one participant is speaking at the same moment in time, the method and system analyze the audio streams from the terminals and identify a terminal associated with a dominant party. When multiple participants are using the terminal associated with the dominant party, the method and system identify the speaking participant within the dominant party based on an indication received from the speaker.

In one embodiment, the system is implemented in an H.323-compliant telephony environment. A multipoint control unit controls the mixing of audio streams from H.323-compliant terminals and the broadcasting of an audio stream to the terminals. A speaker identifier service cooperates with the multipoint control unit to identify a speaker and to provide the identity of the speaker to the terminals.

Before commencing the conference, the participants register with the speaker identifier service. This involves identifying which terminal the participant is using, registering the participant's name and, for those terminals that are used by more than one participant, identifying which speaker indication is associated with each participant.

During the conference, the multipoint processor in the multipoint control unit identifies the terminal associated with the dominant speaker and broadcasts the audio stream associated with that terminal to all of the terminals in the conference. In addition, the multipoint processor sends the dominant speaker terminal information to the speaker identifier service.

The speaker identifier service compares the dominant speaker terminal information with the speaker identification information that was previously registered to obtain the identification information for that speaker. If more than one speaker is associated with the dominant terminal, the speaker identifier service compares the speaker indication (provided it was sent by the actual speaker) with the speaker identification information that was previously registered. From this, the speaker identifier service obtains the identification information of the speaker who sent the speaker indication.

Once the speaker identification information has been obtained, the speaker identifier service sends this information to each of the terminals over a secondary channel. In response, the terminals display a representation of this information. Thus, each participant will have a visual indication of who is speaking during the course of the conference.

BRIEF DESCRIPTION OF THE DRAWINGS

These and other features of the invention will become apparent from the following description and claims, when taken with the accompanying drawings, wherein similar reference characters refer to similar elements throughout and in which:

DETAILED DESCRIPTION OF PREFERRED EMBODIMENTS

Figure 1:
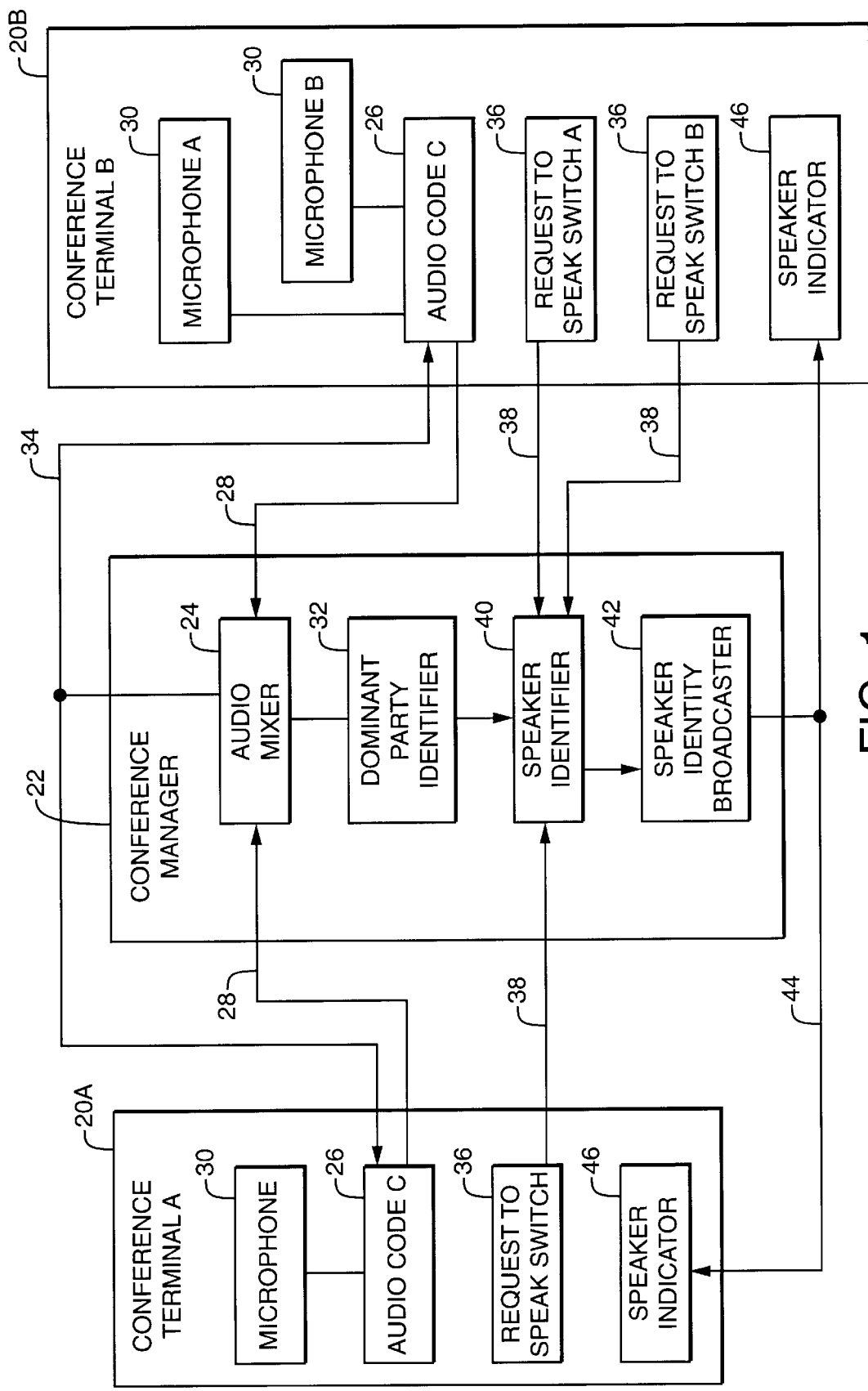
FIG. 1 is a block diagram of one embodiment of a multi-party conference system constructed according to the invention.

In FIG. 1, conference participants (not shown) use conference terminals 20 to conduct an audio conference. In accordance with the invention, a conference manager 22 determines which of the conference participants is speaking and sends a corresponding indication to each of the terminals 20. The terminals 20, in turn, provide the speaker indication to the conference participants.

The conference manager 22 distributes the audio for the conference to each of the terminals 20. An audio mixer 24 in the conference manager 22 receives audio signals sent by audio codecs 26 over audio channels as represented by lines 28. Typically, the audio signals originate from a microphone 30 or from a traditional telephone handset (not shown). A dominant party identifier 32 analyzes the audio signals and determines which party is currently dominating the conversation. This analysis may include, for example, a comparison of the amplitudes of the audio signals. Based on the dominant party information provided by the dominant party identifier 32, the audio mixer 24 selects the corresponding audio stream and broadcasts it to the terminals 20 via another audio channel (represented by line 34).

The terminals 20 may include a request to speak switch 36. In some conferencing systems, the switch 36 is used by a conference participant to request priority to speak. Thus, the dominant party identifier 32 of the conference manager 22 or a separate speaker identifier 40 may receive the signals from the request to speak switches and select an audio stream to be broadcast based on this indication in addition to the dominant speaker analysis.

In accordance with the invention, the request to speak indication is used to identify a particular conference speaker. Conference terminal B 20B illustrates a configuration where more than one conference participant participates in the conference through a single terminal. In this case, the terminal 20B may be configured so that a request to speak switch 36 is assigned to each participant. In addition, each participant may be assigned their own microphone 30. In any event, a participant may use the request to speak switch 36 to inform the conference manager 22 (via communication channels represented by lines 38) that he or she is speaking.

A speaker identifier 40 uses the dominant party information and the request to speak information to determine precisely which participant is speaking. The speaker identifier 40 sends this information to a speaker identity broadcaster 42 that, in turn, broadcasts the speaker's identity to each of the terminals 20 via a channel represented by the line 44.

Each terminal 20 includes a speaker indicator 46 that provides the speaker's identity to the conference participants. Typically, the speaker indicator 46 consists of a display device that displays the name of the speaker or an identifier that identifies the terminal used by the speaker.

With the above description in mind, an embodiment of the invention implemented in an H.323-based system is described in FIGS. 2–6. H.323 defines components and protocols for sending multimedia information streams between terminals via a packet network. A draft of the second version of this standard has been published by the telecommunications standardization section of the International Telecommunications Union ("ITU-T") and is entitled: ITU-T Recommendation H.323V2, "Packet Based Multimedia Communications Systems," Mar. 27,1997, the contents of which is hereby incorporated herein by reference.

Figure 2:
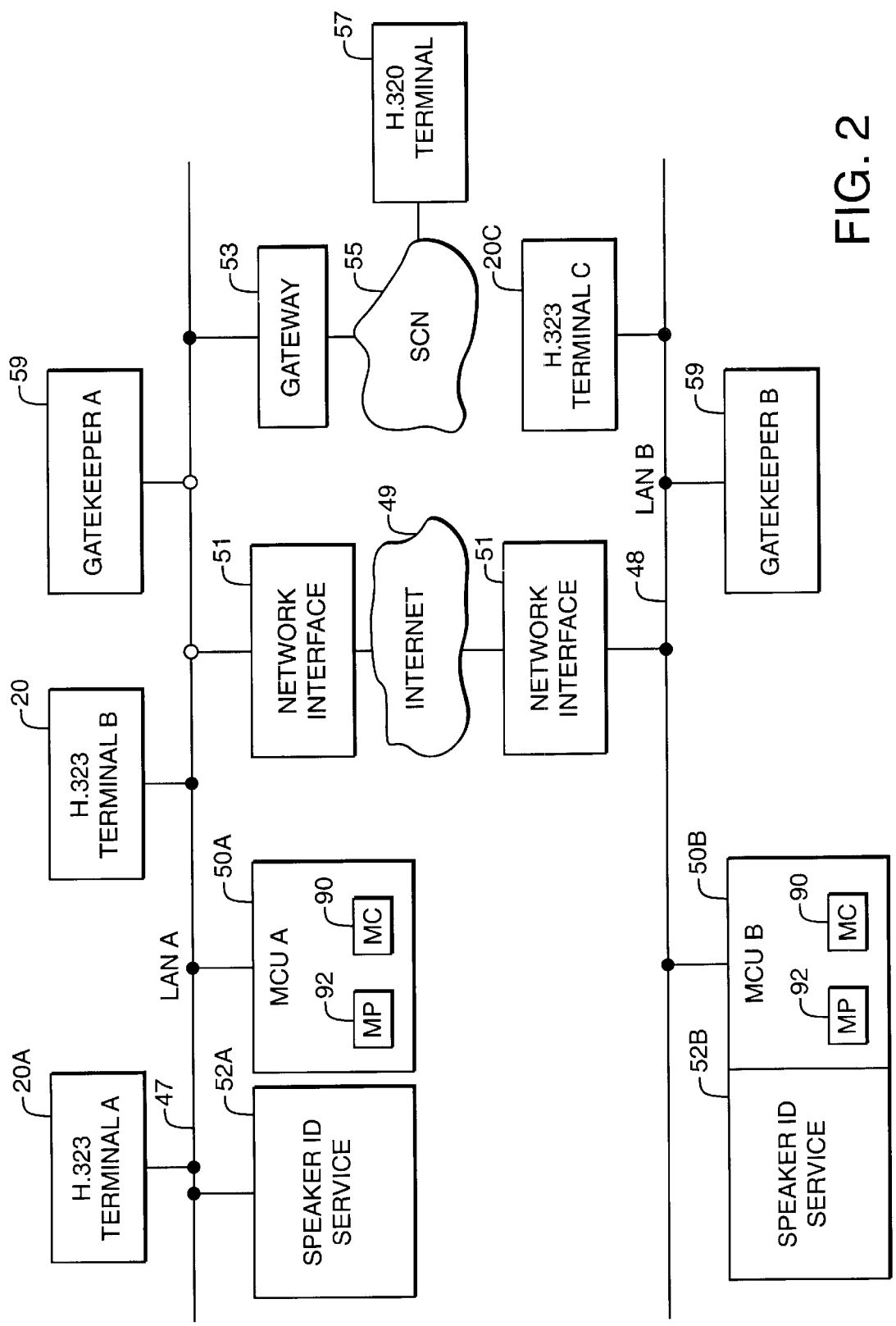
FIG. 2 is a block diagram of a network that include one embodiment of an H.323-based conference system constructed according to the invention.

FIG. 2 illustrates many of the components in a typical H.323 system. H.323 terminals 20 support audio and, optionally, video and data. The details of an H.323 terminal are described in more detail in FIG. 4.

The terminals 20 communicate with one another over a packet-based network. This network may be, for example, a point-to-point connection (not shown) or a single network segment (e.g., a local area network "LAN" such as LAN A 47 in FIG. 2). The network also may consist of an inter-network having multiple segments such as the combination of the LANs (LAN A 47 and LAN B 48) and Internet 49 connected by network interface components 51 (e.g., routers) as depicted in FIG. 2.

A gateway 53 interfaces the packet network to a switched circuit network 55 ("SCN") such as the public telephone network. The gateway provides translation between the transmission formats and the communication procedures of the two networks. This enables H.323 terminals to communicate with SCN-based terminals such as integrated services digital network ("ISDN") terminals 57.

A gatekeeper 59 provides address translation and controls access to the network for the H.323 components within the zone of the gatekeeper 59. The gatekeeper's zone includes all of the terminals 20 and other H.323 components, including a multipoint control unit (MCU) 50, speaker ID service 52, and gateway 53, that are registered with the gatekeeper 59.

H.323 defines several components that support multipoint conferences. A multipoint controller 90 ("MC") controls the terminals participating in a multipoint conference. For example, the MC 90 carries out the capabilities exchange with each terminal. A multipoint processor 92 ("MP") provides centralized processing of the audio, video and data streams generated by the terminals 20. Under the control of the MC 90, the MP 92 may mix, switch or perform other processes on the streams, then route the processed streams back to the terminals 20. The MCU 50 provides support for multipoint conferences. An MCU 50 always includes an MC 90 and may include one or more MPs 92.

The H.323 components communicate by transmitting several types of information streams between one another. Under the H.323 specification, audio streams may be transmitted using, for example, G.711, G.722, G.728, G.723 or G.729 encoding rules. Video streams may be transmitted using, for example, H.261 or H.263 encoding. Data streams may use T.120 or other suitable protocol. Signaling functions may use H.225/Q.931 protocol. Control functions may use H.245 control signaling. Details of the protocols defined for H.323 and of the specifications for the H.323 terminals, MCUs, and other components referred to herein may be found, for example, in the H.323 specification referenced above.

In addition to the conventional H.323 components previously described, FIG. 2 includes a speaker ID service 52 that causes the name of the current speaker in a conference to be displayed by the H.323 terminals 20 used by the conference participants. The speaker ID device 52 includes the speaker identifier 40 of the conference manager 22 as described above in connection with the other components of the conference manager 22, including the mixer 24, dominant party identifier 32, and speaker identity broadcaster 42 the speaker identifier 42 included in the MCU 50 as will be described in more detail below.

Figure 3:
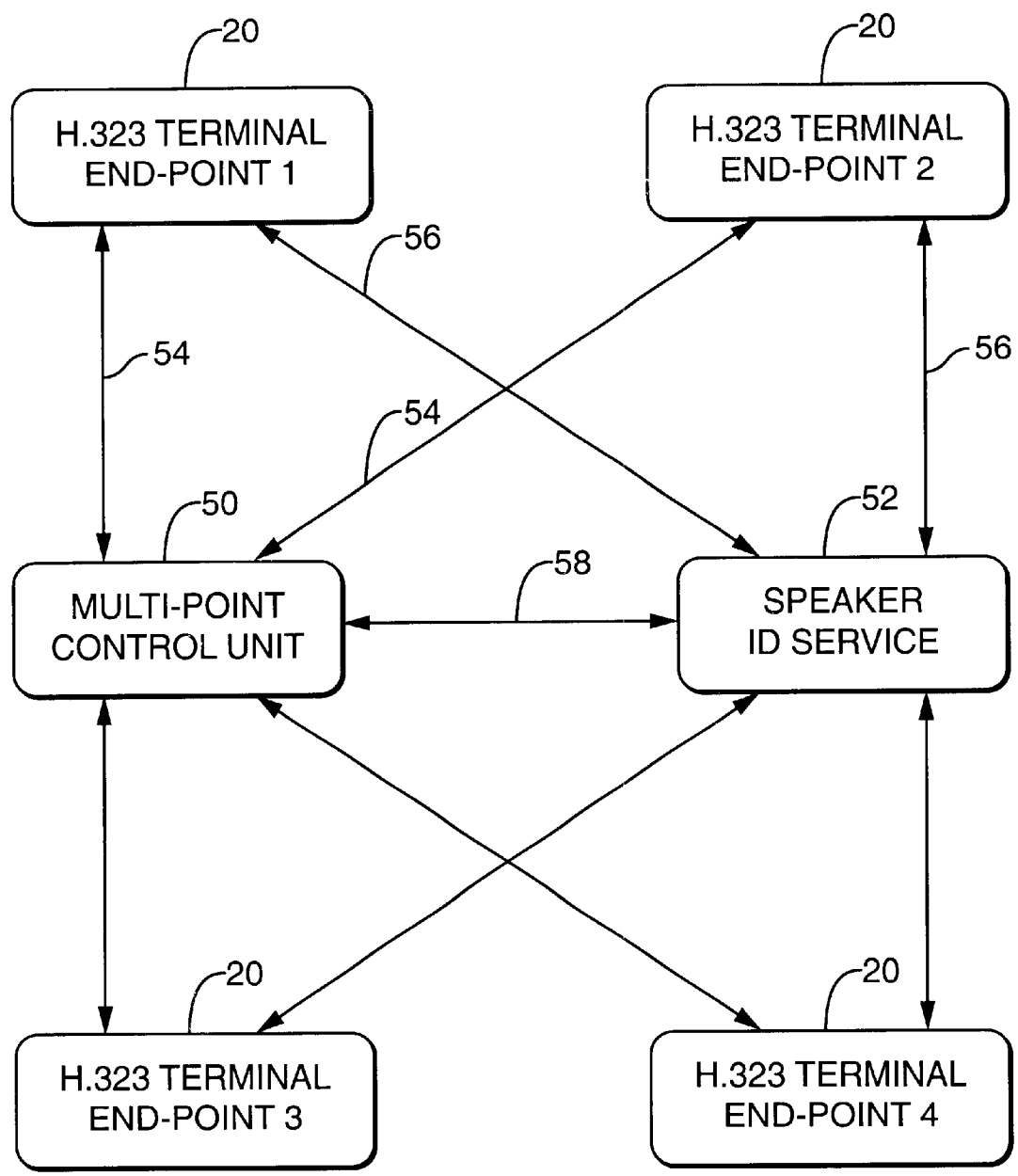
FIG. 3 is a block diagram illustrating several components of one embodiment of an H.323-based conference system constructed according to the invention.

FIG. 3 illustrates some of the messages that flow between the speaker ID service 52, the H.323 terminals 20 and the MCU 50.

FIG. 3 depicts a conference between four H.323 terminals 20, each of which includes some form of graphical user interface (not shown). The MCU 50 contains an MC 90 and an MP 92 (not shown) to control a multiparty conference. The speaker ID service 52 comprises the speaker identifier 40 of the conference manager 22 and therefore provides speaker identification information to the graphical user interface ("GUI") of the terminals 20, as described above in connection with FIG. 1. The lines between the terminals 20, the MCU 50 and the speaker ID service 52 represent logical channels that are established between these components during a conference. In practice, these channels are established via one or more packet networks, e.g., LAN A 47, as illustrated in FIG. 2.

The lines 54 between the MCU 50 and the terminals 20 represent the audio channels that are established during the conference. Audio signals from each terminal 20 are routed to the MCU 50 via one of the channels. The MP 92 in the MCU 50 mixes the audio signals and broadcasts the resultant stream back to the terminals 20 over these audio channels.

The lines 56 between the speaker ID service 52 and the terminals 20 represent the data channels that convey the speaker identification-related information. The speaker ID service 52 sends current speaker information to the terminals 20 via these data channels. In addition, these data channels convey request to speak information from the terminals 20 to the speaker ID service 52 when a participant presses a speaker identification button for the terminal 20. Alternatively, that information can be transmitted through the MCU 50 along lines 54 and then forwarded to the speaker ID service 52 along line 58, or along any other suitable route.

The line 58 represents the channel between the MCU 50 and the speaker ID service 52. The MP sends the dominant speaker identification to the speaker ID service 52 via this channel. The setup procedure for these channels is discussed in more detail below in conjunction with FIGS. 4, 5 and 6.

Figure 4:
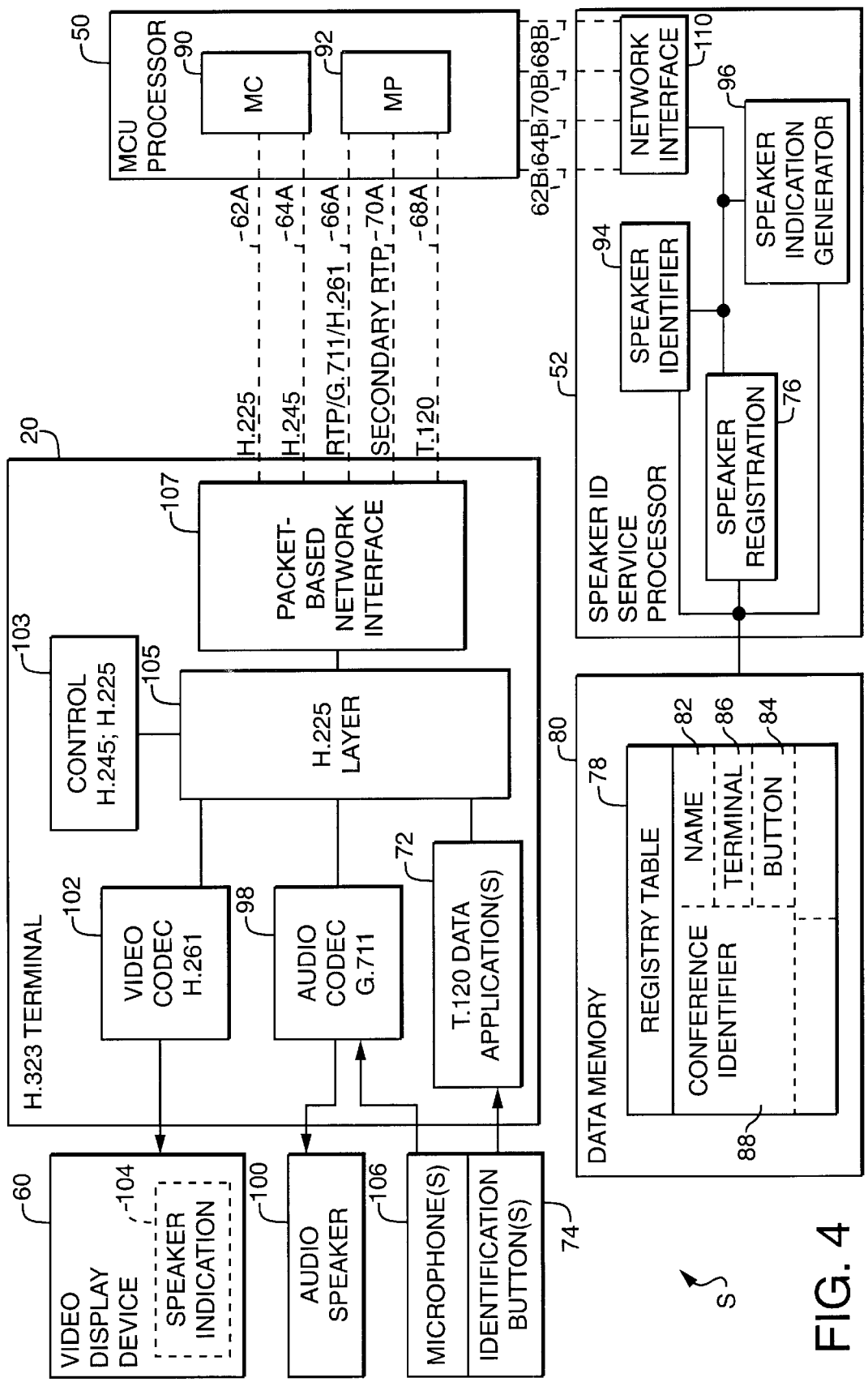
FIG. 4 is a block diagram of one embodiment of a conference system constructed according to the invention.

FIG. 4 describes the components of FIG. 3 as implemented in one embodiment of an H.323-based conferencing system S. In FIG. 4, an H.323 terminal 20 and associated conferencing equipment provide the conference interface for a conference participant (not shown). The terminal 20 includes various codecs (98 and 102), control protocol components (103 and 105) and interface components 107. The details of these components are discussed below. To reduce the complexity of FIG. 4, only one H.323 terminal 20 is shown. In general, the H.323 terminals that are not illustrated interface with the components of the system S in the manner illustrated in FIG. 4.

A speaker ID service processor 52 cooperates with an MCU processor 50 to display the name (or other information) of the current speaker on the display screen of a display device 60 connected to (or, typically, embedded within) the terminal 20. The H.323 terminal 20, the MCU 50 and the speaker ID service processor 52 communicate via several logical channels as represented by dashed lines 62, 64, 66, 68 and 70.

Figure 5:
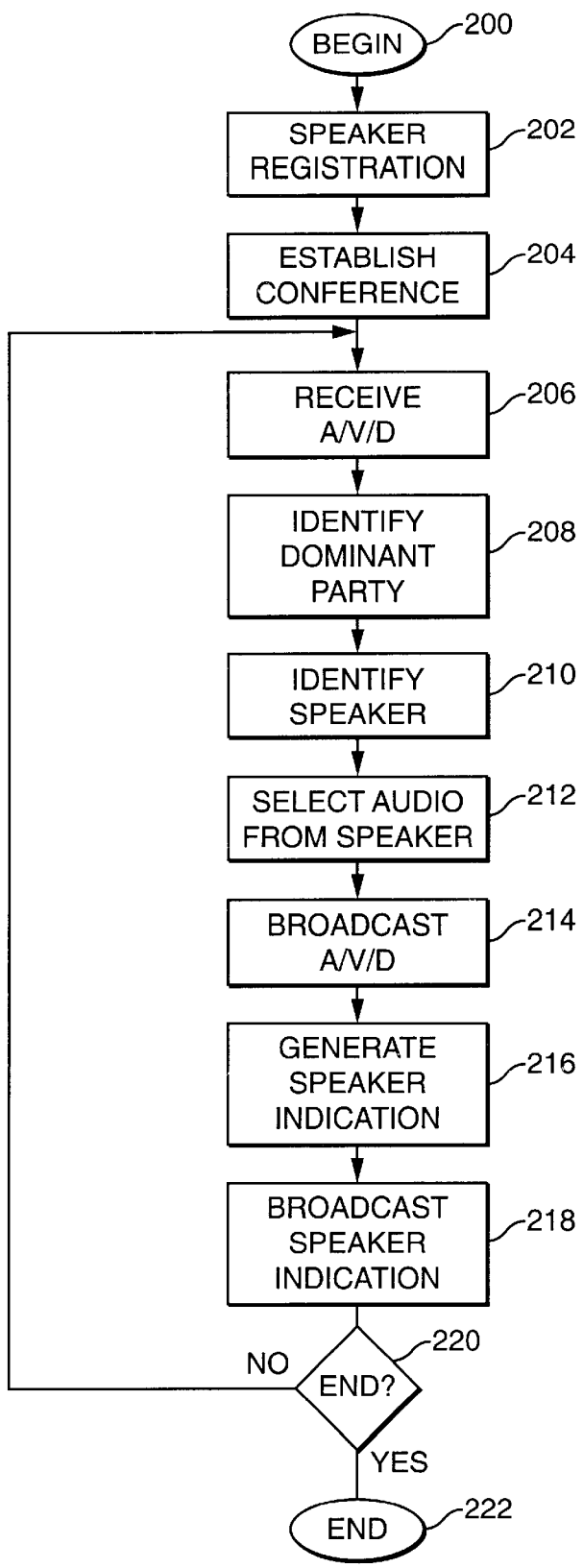
FIG. 5 is a flow chart of operations that may be performed by the embodiment of FIG. 4 or by other embodiments constructed according to the invention.
Figure 6:
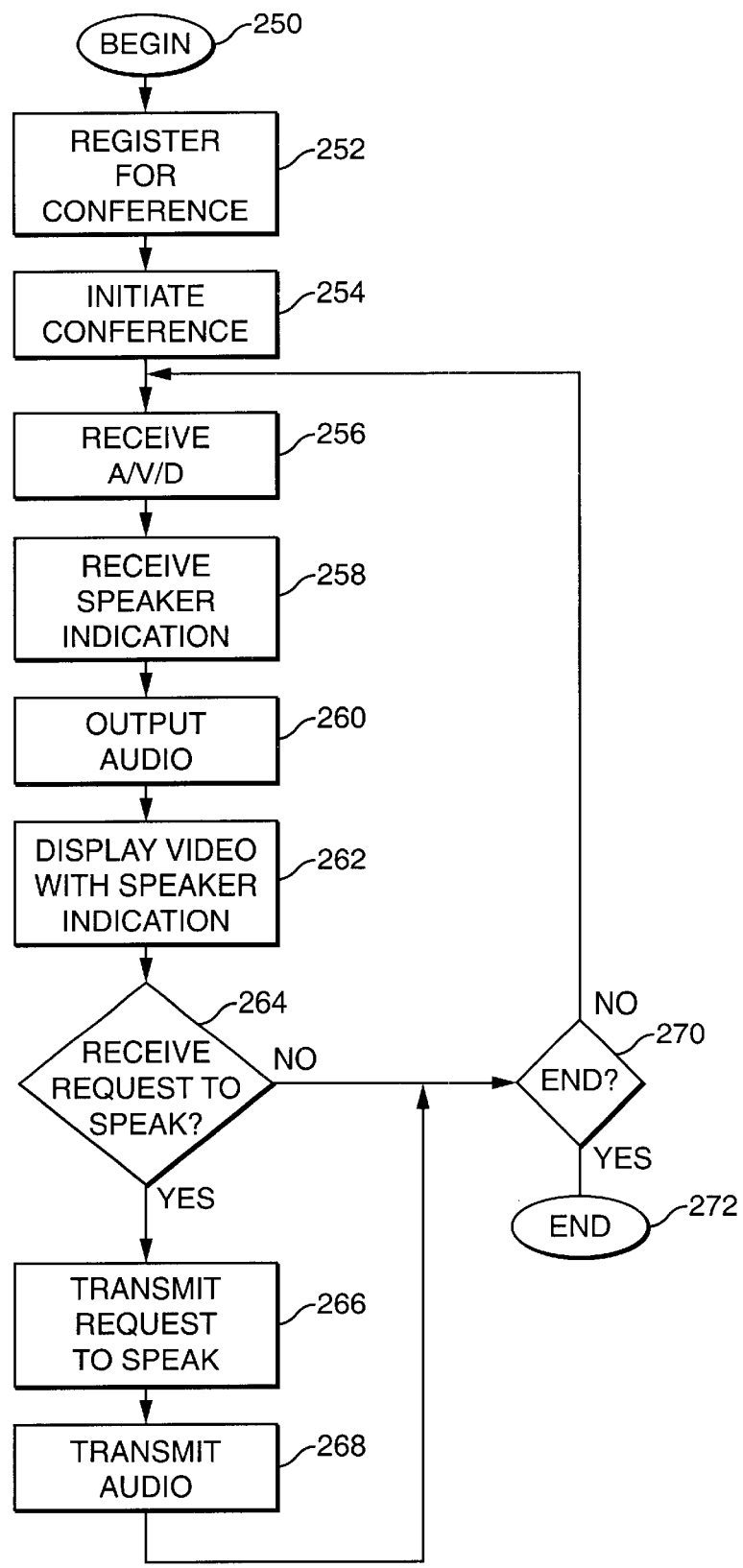
FIG. 6 is a flow chart of operations that may be performed by a terminal as represented by the embodiment of FIG. 4 or by other embodiments constructed according to the invention.

The operation of the components of FIG. 4 will be discussed in detail in conjunction with FIGS. 5 and 6. FIG. 5 describes operations performed by the MCU 50 and the speaker ID service 52 beginning at block 200. FIG. 6 describes operations performed by the terminals 20 and associated equipment beginning at block 250.

Before initiating a conference call, the participants register with the speaker ID service 52 through their terminals 20 (FIG. 6, block 252). The registration interface may be provided on the terminal by a data application (e.g., application 72 in FIG. 4). The registration process typically involves registering the name of the participant and an identifier associated with an identification button 74 that will be used by the participant. Alternatively, this registration information may already be known, for example, as a result of H.323 gatekeeper registration. In any event, this registration information is sent to the speaker ID service 52 via a channel (represented by dashed lines 68) that is established through the MCU 50.

A speaker registration component 76 of the speaker ID service 52 stores the registration information in a registry table 78 in a data memory 80 (block 202, FIG. 5). As shown in FIG. 4, this information may include the name 82 of each participant, a reference 84 to the identification button used by the participant and a reference 86 to the terminal used by the participant. In addition, the registry table may store information related to the conference such as an identifier 88 that enables the speaker ID service 52 to readily locate all the entries for a given conference.

A participant may initiate a conference by placing a call through his or her terminal 20 (block 254, FIG. 6). In accordance with conventional H.323 procedures, the terminal 20 establishes several channels for each call. Briefly, the terminals 20 in the conference exchange H.225 RAS messages ARQ/ACF and perform the H.225 SETUP/ CONNECT sequence. Then, H.245 control and logical channels are established between the terminals 20. Finally, as necessary, the terminals 20 and the MCU 50 set up the audio, video and data channels. In general, the information streams described above are formatted and sent to the network interface 107 in the manner specified by the H.225 protocol.

In FIG. 4, the information streams output by the network interface 107 are represented by the dashed lines 62A, 64A, 66A, 68A and 70A. An H.225 channel 62A carries messages related to signaling and multiplexing operations, and is connected to an H.225 layer 105 which performs the H.225 setup/connect sequence between the terminals 20 and MCU 50. An H.245 channel 64A carries control messages. A Real Time Protocol ("RTP") channel 66A carries the audio and video data. This includes the G.711 audio streams and the H.261 video streams. A data channel 68A carries data streams. In accordance with the invention, another RTP channel, a secondary RTP channel 70A, is established to carry speaker identifier information. This channel is discussed in more detail below. After all of the channels have been set up, each terminal 20 may begin streaming information over the channels.

The terminal 20 of FIG. 4 is configured in the H.323 centralized multipoint mode of operation. In this mode of operation, the terminals 20 in the conference communicate with the multipoint controller 90 ("MC") of the MCU 50 in a point-to-point manner on the control channel 64A. Here, the MC 90 performs the H.245 control functions.

The terminals 20 communicate with the multipoint processor 92 ("MP") in a point-to-point manner on the audio, video and data channels (66A and 68A). Thus, the MP 92 performs video switching or mixing, audio mixing, and T.120 multipoint data distribution. The MP 92 transmits the resulting video, audio and data streams back to the terminals 20 over these same channels.

As FIG. 4 illustrates, the speaker ID service 52 also communicates with the MCU 50 and the terminals 20 over several channels 62B, 64B, 68B and 70B. For example, various items of control and signaling information are transferred over an H.245 channel 64B and an H.225 channel 62B, respectively. The identification button information may be received over a data channel 68B, for example a T.120 data channel or other suitable channel. The speaker identity information may be sent over a secondary RTP channel 70B. Procedures for setting up and communicating over the channels discussed above are treated in the H.323 reference cited above. Accordingly, the details of these procedures will not be discussed further here.

H.323 supports several methods of establishing a conference call. For example, a conference call also may be set up by expanding a two-party call into a multipoint call using the ad hoc multipoint conference feature of H.323. Details of the H.323 ad hoc conference and other conferencing methods are set forth, for example, in the H.323 reference cited above. Of primary importance here is that once a conference call is established, the channels depicted in FIG. 4 (except perhaps the secondary: RTP channel 70) will be up and running.

Referring again to FIG. 5, as stated above, the audio/ video/data ("A/V/D") streams from the terminals 20 are routed to the MP 92 (block 206). As the MP 92 mixes the audio streams, it determines which party (i.e., which audio stream from a terminal 20) is the dominant party (block 208). The MP 92 sends the dominant party information to the speaker ID service 52 via the data channel 68B.

At block 210, a speaker identifier 94 determines the identity of the current speaker. When each party in the conference consists of one person, i.e., when each terminal 20 is being used by a single participant, the current speaker is simply the dominant speaker identified at block 208.

When a party consists of more than one person, i.e., when two or more participants are using the same terminal 20, the current speaker is the participant at the dominant party terminal who pressed his or her identification button 74. In one embodiment, the identification button 74 consists of a simple push-button switch. The switch is configured so that when it is pressed the switch sends a signal to a data application 72. The data application 72, in turn, sends a message to the speaker ID service 52 via the T.120 channel 68. This message includes information that uniquely identifies the button 74 that was pressed.

The identification button signal may also be used to determine which party is allowed to speak. In this case, the speaker ID service 52 uses the signal to arbitrate requests to speak. Thus, when several parties request to speak at the same moment in time, the speaker ID service 52 may follow predefined selection criteria to decide who will be allowed to speak. When a given party is selected, the speaker ID service 52 sends a message to the party (e.g., over the secondary RTP channel 70) that informs the party that he or she may speak. Then, the speaker ID service 52 sends a message to the MC 90 to control the MP 92 to broadcast the audio from that source until another party is allowed to speak.

Once the current speaker is identified, at block 212 the speaker ID service 52 sends a message to the MC 90 to control the MP 92 to broadcast the audio stream coming from the current speaker (i.e., the speaker's terminal 20). Thus, at block 214, the MP 92 broadcasts the audio/video/ data to the terminals 20. In general, the operations related to distributing the video and data are similar to those practiced in conventional systems. Accordingly, these aspects of the system of FIG. 4 will not be treated further here.

At block 216, a speaker indication generator 96 uses the identified speaker information (e.g., terminal or button number) to look up the speaker's identification information in the registry table 78. In addition to the information previously mentioned, the registry table 78 may contain information such as the speaker's title, location, organization, or any other information the participants deem important. The speaker indication generator 96 formats this information into a message that is broadcast to the terminals 20 over the secondary RTP channel 70 via the MCU 50 (block 218).

Concluding with the operation of the MCU 50 and the speaker ID service 52, if, at block 220 the conference is to be terminated, the process proceeds to block 222. Otherwise these components continue to handle the conference call as above as represented by the process flow back to block 206.

Turning again to FIG. 6 and the operations of the terminals 20 and associated interface equipment, at block 256 the terminal 20 receives audio/video/data that was sent as discussed above in conjunction with block 214 in FIG. 5. In the centralized multipoint mode of operation, the MCU 50 sends this information to the terminal 20 via the RTP channel 66A and the T.120 data channel 68A.

At block 258, the terminal 20 receives the speaker indication message that was sent by the speaker indication generator 96 as discussed above in conjunction with block 218 in FIG. 5. Again, this information is received over the secondary RTP channel 70A.

At block 260, the received audio stream is processed by an audio codec 98, then sent to an audio speaker 100. If necessary, the data received over the T.120 channel 68A is also routed to the appropriate data applications 72.

At block 262, the received video stream is processed by a video codec 102, then sent to the display device 60. In addition, the video codec 102 processes the speaker indication information and presents it, for example, in a window 104 on the screen of the display 60. Accordingly, all participants in the conference receive a visual indication of the identity of the current speaker.

The next blocks describe the procedures performed when a participant associated with the terminal 20 wishes to speak. In practice, the operations described in blocks 264, 266 and 268 are performed in an autonomous manner with respect to the operations of blocks 256 through 262. Thus, the particular order given in FIG. 6 is merely for illustrative purposes. At block 264, if the terminal 20 has received a request to speak indication (i.e., a participant has pressed the identification button 74), the T.120 data application 72 generates the message discussed above in conjunction with block 210 in FIG. 5. This message is sent to the speaker ID service 52 via the MCU 50 (block 266).

Then, at block 268, the audio codec 98 processes the speech from the participant (as received from a microphone 106). The audio codec 98 sends the audio to the MP 92 via the RTP channel 66A. As discussed above, however, when the request to speak indication is used to arbitrate among speakers, the audio codec 98 may wait until the terminal 20 has received an authorization to speak from the speaker ID service 52.

Concluding with the operation of the terminal 20 and its associated equipment, if, at block 270 the conference is to be terminated, the process proceeds to block 272. Otherwise the terminal 20 and the equipment continue to handle the conference call as discussed above as represented by the process flow back to block 256.

The implementation of the components described in FIG. 4 in a conferencing system will now be discussed in conjunction with FIG. 2. Typically, the terminal 20 may be integrated into a personal computer or implemented in a stand-alone device such as a video-telephone. Thus, data applications 72, control functions 103 and H.225 layer functions 105 may be implemented as software routines executed by the processor of the computer or the video-telephone. The audio codec 98 and the video codec 102 may be implemented using various combinations of standard computer components, plug-in cards and software programs. The implementation and operations of these components and software routines are known in the data communications art and will not be treated further here.

The associated equipment also may be implemented using many readily available components. The monitor of the personal computer or the display of the video-telephone along with associated software may provide the GUI that displays the speaker indication 104. A variety of audio components and software programs may be used in conjunction with the telephone interface components (e.g., audio speaker 100 and microphone 106). The speaker 100 and microphone 106 may be stand-alone components or they may be built into the computer or the video-telephone.

The identification button 74 also may take a several different forms. For example, the button may be integrated into a stand-alone microphone or into the video-phone. A soft key implemented on the personal computer or videophone may be used to generate the identification signal. A computer mouse may be used in conjunction with the GUI on the display device to generate this signal. Alternatively, the microphone and associated circuitry may automatically generate a signal when a participant speaks into the microphone.

The terminal 20 communicates with the other system components over a packet network such as Ethernet. Thus, each of the channels described in FIG. 4 is established over the packet network (e.g., LAN A 47 in FIG. 2). Typically, the packet-based network interface 107 will be implemented using an network interface card and associated software.

In accordance with the H.323 standard, the H.323 terminals 20 may communicate with terminals on other networks. For example, a participant in a conference may use an ISDN terminal 57 that supports the H.320 protocol. In this case, the information streams flow between the H.323 terminals 20 and the H.320 terminals 57 via the gateway 53 and the SCN 55.

Also, the participants in a conference may use terminals that are installed on different sub-networks. For example, a conference may be set up between terminal A 20A on LAN A 47 and terminal C 20C on LAN B 48.

In either case, the information stream flow is similar to the flow previously discussed. In the centralized mode of operation, audio from a terminal 20 is routed to an MCU 50 and the MCU 50 broadcasts the audio back to the terminals 20. Also as above, the speaker ID service 52 broadcasts the speaker indication to each of the terminals 20.

When a terminal 20 is located on another network that also has an MC 90 (e.g., MCU B 50B), the conference setup procedure will involve selecting one of the MCs 90 as the master so that only one of the MCs 90 controls the conference. In this case, the speaker ID service 52 associated with the master MC 90 typically will control the speaker identification procedure.

The speaker ID service 52 may be implemented as a stand-alone unit as represented by speaker ID service 52A. For example, the functions of the speaker ID service 52 may be integrated into a personal computer. In this case, the speaker ID service includes a network interface 110 similar to those described above.

Alternatively, the speaker ID service 52 may be integrated into an MCU as represented by speaker ID service 52B. In this case, a network interface may not be needed.

The MCU, gateway, and gatekeeper components typically are implemented as stand-alone units. These components may be obtained from third-party suppliers.

The speaker identification system of the present invention in one illustrative embodiment may be incorporated in a hierarchical communications network, as is disclosed in co-pending U.S. patent application Ser. No. 60/105,326 of Gardell et al. entitled "A HIGH SPEED COMMUNICATIONS SYSTEM OPERATING OVER A COMPUTER NETWORK", and filed on Oct. 3, 1998, the disclosure of which is incorporated herein by reference. Thus, the speaker identification capabilities disclosed herein may be implemented in a nationwide or even worldwide hierarchical computer network.

From the above, it may be seen that the invention provides an effective system for identifying a speaker in a multi-party conference. While certain embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, various methods may be used for identifying the current speaker or speakers in a conference. Numerous techniques, including visual displays and audible responses, in a variety of formats may be used to provide the identity of the speaker or speakers to the participants. The teachings of the invention may be practiced in conjunction with a variety of conferencing systems that use various protocols. Thus, the specific structures and methods discussed in detail above are merely illustrative of a few specific embodiments of the invention.

What is claimed is:

1. A method of indicating which of a plurality of parties participating in a multi-party conference is a speaking party, the method comprising:

receiving audio information from all speaking parties of the plurality of parties participating in the multi-party conference;

comparing the audio information from all of the speaking parties in the multi-party conference;

selecting the audio information that corresponds to dominant audio information based on the comparison;

identifying the speaking party associated with the dominant audio information as a dominant speaking party;

broadcasting only the dominant audio information associated with the dominant speaking party; and providing at least one identifier for display to identify the dominant speaking party to the plurality of parties participating in the multi-party conference.

2. The method of claim 1 further comprising:

displaying the at least one identifier.

3. The method of claim 1 wherein the identifier comprises a name of the dominant speaking party.

4. The method of claim 1 wherein the identifier identifies a terminal associated with the dominant speaking party.

5. The method of claim 1 further comprising:

storing, in a data memory, at least one identifier associated with each of the plurality of parties.

6. The method of claim 5 wherein the providing further comprises:

matching the dominant speaking party with at least one stored identifier; and retrieving the matched at least one identifier from the data memory.

7. The method of claim 1 wherein the identifying further comprises:

processing the dominant audio information to identify a terminal associated with the dominant speaking party.

8. The method of claim 1 further comprising:

receiving from a terminal associated with a speaking party an indication that identifies the speaking party.

9. The method of claim 1 wherein a plurality of H.323-compliant terminals are associated with the plurality of parties participating in the multi-party conference.

10. The method of claim 9 wherein the providing further comprises:

sending the at least one identifier over at least one secondary real-time protocol channel.

11. The method of claim 9 wherein the identifying further comprises:

receiving an H.245 message, from a terminal associated with the dominant speaking party, that identifies the dominant speaking party.

12. A method of identifying a speaking party from among a plurality of parties participating in a multi-party conference from a plurality of terminals, the method comprising:

receiving audio information from all speaking parties of the plurality of parties participating in the multi-party conference;

comparing the audio information from all of the speaking parties in the multi-party conference;

selecting the audio information that corresponds to dominant audio information based on the comparison;

identifying one of the terminals associated with the dominant audio information;

broadcasting only the dominant audio information associated with the identified terminal;

obtaining an indication that identifies a dominant speaking party, of the plurality of parties, associated with the identified terminal; and transmitting the indication for display by terminals used by the plurality of parties participating in the multi-party conference.

13. The method of claim 12 wherein the obtaining further comprises:

receiving from the identified terminal associated with the dominant speaking party the indication that identifies the dominant speaking party.

14. The method of claim 12 further comprising:

storing, in data memory, at least one identifier associated with each of the plurality of parties.

15. The method of 12 wherein the multi-party conference includes an H.323 protocol-based multi-party conference.

16. The method of claim 15 wherein the obtaining further comprises:

receiving an H.245 message, from the identified terminal associated with the dominant speaking party, that identifies the dominant speaking party.

17. The method of claim 16 wherein the transmitting comprises:

providing at least one identifier, associated with the dominant speaking party, to the plurality of terminals.

18. The method of claim 19 wherein the providing further comprises:

sending the at least one identifier over at least one secondary real-time protocol channel.

19. The method of claim 12 wherein at least one of the terminals corresponds to two or more of the plurality of parties participating in the multi-party conference.

20. The method of claim 19 wherein the obtaining an indication includes:

obtaining an indication that identifies one of the two or more parties corresponding to the identified terminal as the dominant speaking party.

21. A system for indicating which of a plurality of parties participating in a multi-party conference, using a plurality of terminals, is currently speaking, the system comprising:

a multipoint processor configured to:

receive audio information from all speaking parties of the plurality of parties participating in the multi-party conference, compare the audio information from all of the speaking parties in the multi-party conference, select the audio information that corresponds to dominant audio information based on the comparison, broadcast only the dominant audio information to the plurality of parties in the multi-party conference, and identify a terminal associated with the dominant audio information: and a speaker identifier processor configured to:

identify a currently speaking party from among the plurality of parties based on the identified terminal, and provide at least one identifier for display by the plurality of terminals to identify the currently speaking party to the plurality of parties participating in the multi-party conference.

22. The system of claim 21 further comprising:

a data memory for storing at least one identifier associated with each of the plurality of parties.

23. The system of claim 22, wherein said speaker identifier processor further includes means for registering the identifiers in said data memory.

24. The system of claim 23, wherein said speaker identifier processor further includes means for retrieving identifiers from said data memory and for transmitting the retrieved identifiers to the plurality of terminals.

25. The system of claim 21 further comprising:

a speaker identification switch associated with each of the terminals for sending a signal to said speaker identifier processor.

26. The system of claim 21 further comprising an H.323-compliant terminal for displaying the at least one identifier.

* * * * *